United States Patent [19]

Rausfeisen et al.

[11] Patent Number: 4,894,900

[45] Date of Patent: Jan. 23, 1990

[54] TOOL FOR REMOVING A FUEL INJECTION NOZZLE

[75] Inventors: Robert Rausfeisen, Simsbury; David A. Chace, Canton Center; Leon P. Janik, Suffield, all of Conn.

[73] Assignee: Stanadyne Automotive Corp., Windsor, Conn.

[21] Appl. No.: 243,287

[22] Filed: Sep. 9, 1988

Related U.S. Application Data

[62] Division of Ser. No. 61,711, Jun. 15, 1987, Pat. No. 4,790,055.

[51] Int. Cl.⁴ .......... B23P 19/04

[52] U.S. Cl. .......... 29/256; 29/281.6

[58] Field of Search .......... 29/256, 281.6, 244, 29/252, 426.5, 156.7 R, 525; 239/533.3

[56] References Cited

U.S. PATENT DOCUMENTS

| | | | |
|---|---|---|---|
| 1,865,420 | 6/1932 | Kick | 29/256 |
| 1,866,125 | 7/1932 | Patterson | 29/256 X |
| 2,160,395 | 5/1939 | Wettlaufer | 29/256 X |
| 2,239,609 | 4/1941 | Jensen | 29/256 X |
| 2,253,411 | 8/1941 | Thompson | 29/256 |
| 2,664,620 | 1/1954 | Beasley | 29/256 |
| 2,883,741 | 4/1959 | Yerkes | 29/252 |
| 3,571,887 | 3/1971 | McIntire | 29/256 |
| 3,670,389 | 6/1972 | Shepanski | 29/256 |

FOREIGN PATENT DOCUMENTS

| | | | |
|---|---|---|---|
| 849053 | 9/1952 | Fed. Rep. of Germany | 29/256 |
| 546986 | 11/1922 | France | 29/256 |

*Primary Examiner*—Charlie T. Moon
*Attorney, Agent, or Firm*—Chilton, Alix & Van Kirk

[57] ABSTRACT

A fuel injection nozzle 10 having a nozzle body 12 to which is attached a banjo-type inlet stud 16, by means of heat shrinking. After the shrink fit attachment, a blind passage 20, 22 in the delivery tube portion 134 of the inlet is drilled through to penetrate the nozzle body and form a leak-tight fuel delivery path. A locating plate 106 is supported by a bore 96 in the cylinder head 80 adjacent the nozzle and orients the nozzle into a preselected orientation. In one nozzle embodiment 70, the tip 76 is sealed against the cylinder head socket 84 by a frusto-conical copper annular seal member 82 that is preferentially loaded toward the inner seal diameter. The nozzle cap 14 forms a spring chamber in which a spring subassembly 42 including upper and lower spring seats 48, 46, a spring 44, and stem 186 and pedestal 84 piloting the spring, cooperate to permit independent setting of the valve lift off stop limit F and the spring preload B. The components internal to the nozzle body are all insertable serially, without the need for rotation or other complex fabrication steps. A nozzle removal tool 250 adapted for use with the nozzle includes a yoke member 258 for engaging a shoulder 268 on the nozzle and a jackscrew 254 and jacking bolt 252 arrangement concentric with each other, for lifting the nozzle from its socket in the cylinder head.

4 Claims, 5 Drawing Sheets

TOOL FOR REMOVING A FUEL INJECTION NOZZLE

This is a division of Ser. No. 061,711, filed 6/15/87, now U.S. Pat. No. 4,790,055.

BACKGROUND OF THE INVENTION

The present invention relates to a fuel injection nozzle and clamp assembly for securing the nozzle to the cylinder head of an internal combustion engine.

Fuel injectors of the type contemplated by the present invention have a plunger or valve which is lifted from its seat by the pressure of fuel delivered to the injector by an associated high pressure pump in measured charges in timed relation with the associated engine.

Representative fuel injector assemblies are described in the following U.S. patents:

| U.S. Pat. No. | Inventor | Date |
|---|---|---|
| 3,829,014 | Davis et al | August 13, 1974 |
| 3,980,234 | Bouwkamp | September 14, 1976 |
| 4,163,521 | Roosa | August 7, 1970 |
| 4,205,789 | Raufeisen | June 3, 1980 |
| 4,246,876 | Bouwkamp et al | January 27, 1981 |
| 4,312,479 | Tolan | January 26, 1982 |

The improvements in fuel injection nozzles chronicled by the succession of patents identified above, have been primarily performance related. In the present competitive market for these types of devices, the need has arisen to significantly reduce the cost of materials and fabrication without compromising performance.

The devices represented by the prior art require considerable labor input, particularly in the machining of the parts and the care required in assembly.

SUMMARY OF THE INVENTION

Accordingly, it is an object of the present invention to provide a fuel injection nozzle assembly in which the component parts are simply fabricated, easily assembled by automated processes, and readily installed in an engine, without compromising the performance of the nozzles.

This object is accomplished in accordance with the invention through improvements in several aspects of the conventional fuel injection nozzle assembly.

The connection between the nozzle body and the fuel supply inlet stud has been considerably simplified by a combination of shrink fitting a banjo-type inlet stud onto the nozzle body at the location of the valve chamber, and then drilling and burnishing a passage from the inlet through the nozzle body wall into the valve chamber. The shrink fit of the ring portion of the banjo onto the nozzle body provides satisfactory mechanical rigidity. By drilling and burnishing the passage through the inlet and the wall of the nozzle body after the shrink fit of the ring onto the body, a fluid seal is formed at the intersection of the inlet stud and the nozzle body such that no further sealing between the ring and the nozzle body is required. Once the stud has been secured and the passage burnished, the protruding tubular portion of the stud may be bent at an angle oblique to the nozzle body without affecting joint strength or sealing integrity.

All the internal components of the nozzle body and the nozzle cap portion press fit together end-to-end such that assembly can be accomplished serially starting at one end of the nozzle body, solely with linear insertion of the components. Thus, intricate assembly operations such as rotation, and radial manipulation of parts relative to the nozzle axis are substantially eliminated. This permits automated assembly with a significant savings in cost. Furthermore, the internal components that determine the valve opening pressure and the valve lift limit are designed to fit together so that only one component needs to be ground during assembly to assure that essentially all tolerances are eliminated. Preferably, no sealants or adhesives are used internal to the nozzle.

The connection of the inlet stud to the fuel supply line has been simplified as a result of incorporating the fuel filter as an integral component with the valve guide in the valve chamber. This permits a more straight-forward, cone and inverted flare mating between the male portion of the fuel inlet stud and the female portion of the fuel supply line.

The attachment of the fuel injection nozzle to the cylinder head is accomplished in accordance with another feature of the invention, by a locating plate and clamp subassembly that is torqued onto the cylinder head and which has a cantilevered spring projection that bears down upon the nozzle in the vicinity of the connection of the inlet stud t the nozzle body. The clamp can be utilized with a standard nozzle body or with the so-called "slim tip" nozzle body, in which the nozzle discharge tip insert is of reduced diameter.

A novel seal arrangement is provided in accordance with another feature of the invention, for use with the "slim tip" configuration where the lower nozzle body shoulder engages the mating shoulder in the cylinder head mounting bore. During assembly of the nozzle, a flat washer, preferably of copper, is placed over the nozzle tip into contact with the shoulder portion of the nozzle body. A forming tool is placed over the nozzle tip and forming pressure is applied to the washer such that the washer assumes a substantially frustoconical shape conforming to the shoulder of the nozzle body. The taper angle of the shoulder on the nozzle body from horizontal is greater than the taper angle of the mating shoulder in the mounting bore of the cylinder, so that as the nozzle is clamped down against the cylinder bore shoulder, the copper seal is stressed non-uniformly and thereby behaves somewhat like Belleville spring or washer. This configuration loads the seal in the vicinity of the inner diameter thereof, and provides sufficient loading over a relatively small contact area, to accomplish the required combustion seal.

Yet another feature of the invention is a tool that engages the nozzle for removing the nozzle from the cylinder head. The removal operation begins by the disengagement and removal of the locating plate and clamp subassembly so that the bore in the cylinder block is exposed. A spacer member having a laterally extending yoke is located over the bore and positioned so that the arms of the yoke surround a neck portion of the nozzle body, immediately below a downward facing shoulder thereon. A jack screw having a smooth bore is threadably engaged into a threaded bore in the generally cylindrical body portion of the spacer member, and a jacking bolt is inserted through a smooth bore in the jack screw and threaded into rigid engagement with the cylinder head. Once the bolt has been secured to the cylinder head, the jacking screw is rotated so as to lift the spacer and thereby transmit a lifting force from the yoke arm to the shoulder on the nozzle. Use of this nozzle removal tool minimizes the possibility that a bending moment will be applied to the nozzle during its removal from the cylinder head.

BRIEF DESCRIPTION OF THE DRAWINGS

These and other features and advantages of the invention will be evident to those skilled in this art from the following description of the preferred embodiments and accompanying figures, in which.

DESCRIPTION OF THE PREFERRED EMBODIMENT

Figure 1:
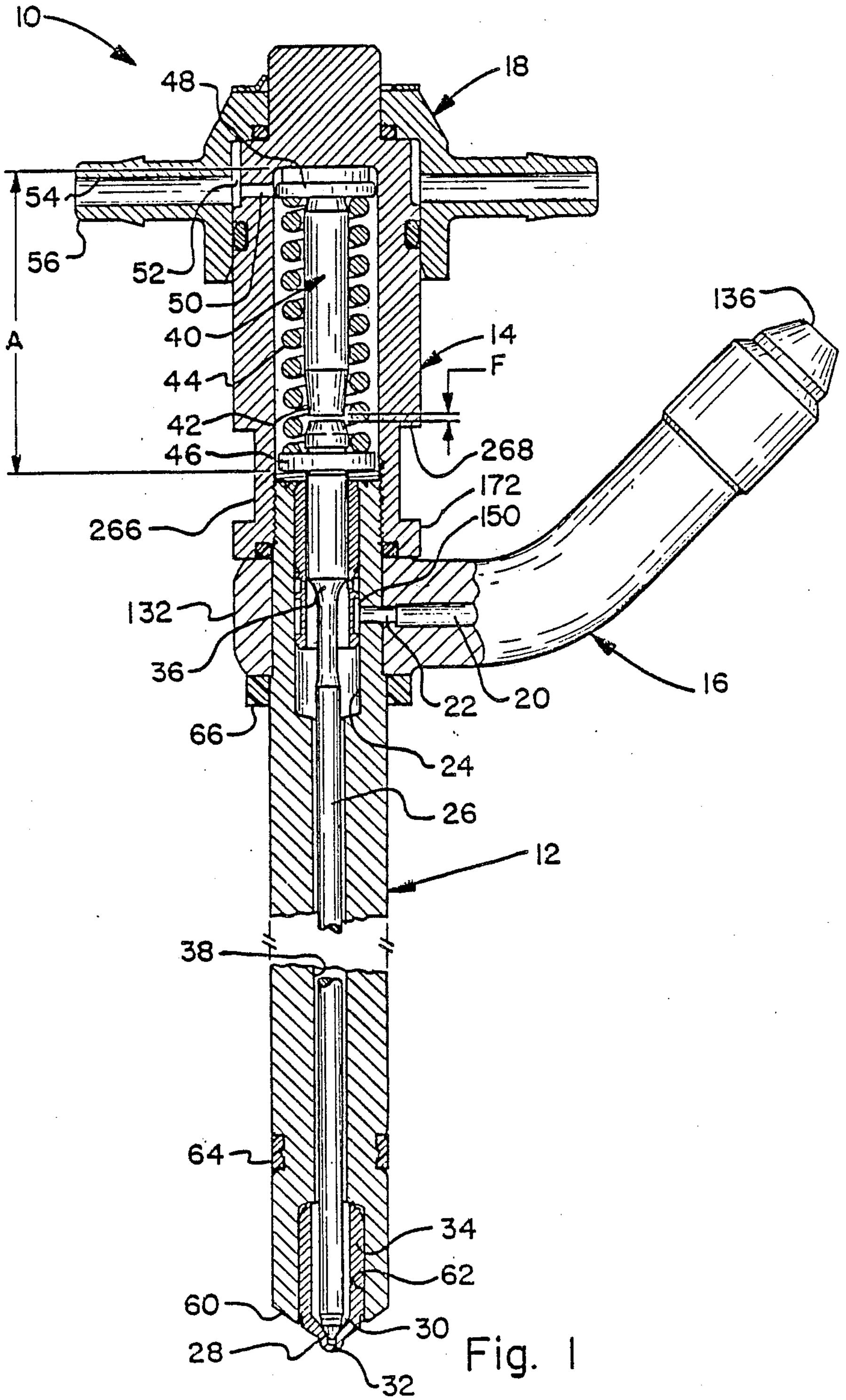
FIG. 1 is an elevation view, partly in section, of a fuel injection nozzle having a standard tip profile, in accordance with a first embodiment of the invention.

FIG. 1 shows a fuel injection nozzle 10 in accordance with the present invention, in which the exterior components are a nozzle body 12, a nozzle cap 14, a fuel inlet stud 16, add a leak-off cap 18. The interior components are shown in greater detail in FIG. 4. During operation, fuel is supplied through passages 20,22 in the fuel inlet stud, to a valve chamber 24 in the upper portion of the nozzle body. An elongated nozzle valve 26 is axially reciprocable within the nozzle body 12 and includes a conical nose 28 at its lower end for sealing against a tip seat 30 and intermittently providing flow through discharge apertures 32 in the nozzle tip 34. The valve 26 is reciprocated as a result of the intermittent fuel pulses entering the valve chamber 24, which apply hydraulic pressure on the actuating surface 36 of the valve. This pressure working on the differential area of the valve in turn lifts the valve nose portion 28 off the tip seat 30, exposing the discharge apertures 32 to the high pressure fuel occupying the space in the axial channel 38 of the nozzle body 12, traversed by the valve 26. The spring subassembly 40 in the nozzle cap 14 includes a central lift stop 42, a coil compression spring 44 and spring seats 46, 48 arranged for biasing the valve downwardly to close the valve and establish a minimum opening pressure. Fluid at low pressure exits the nozzle cap 14 through a channel 50 leading to channels 52, 54 in the hydraulic connections 56 of the leak-off cap 18. A variety of interchangeable leak-off caps can be utilized, depending on customer needs.

In the embodiment illustrated in FIG. 1, the nozzle body 12 has a substantially constant outer diameter except for an inwardly tapered shoulder 60 at the lower end thereof. A nozzle tip insert 34 is press fit and preferably staked into a cavity 62 formed at the lower extremity of the nozzle body, the tip including the valve seat 30 and the discharge apertures 32. Immediately above the tip cavity 62 on the exterior of the nozzle body, is a combustion hem seal 64, and further up the nozzle body immediately below the connection of the nozzle body to the fuel inlet stud is a hem seal 66. Hem 66 is a dust/water seal that reduces vibration, stabilizes the nozzle and establishes the nozzle axial location relative to the cylinder head.

Figure 2:
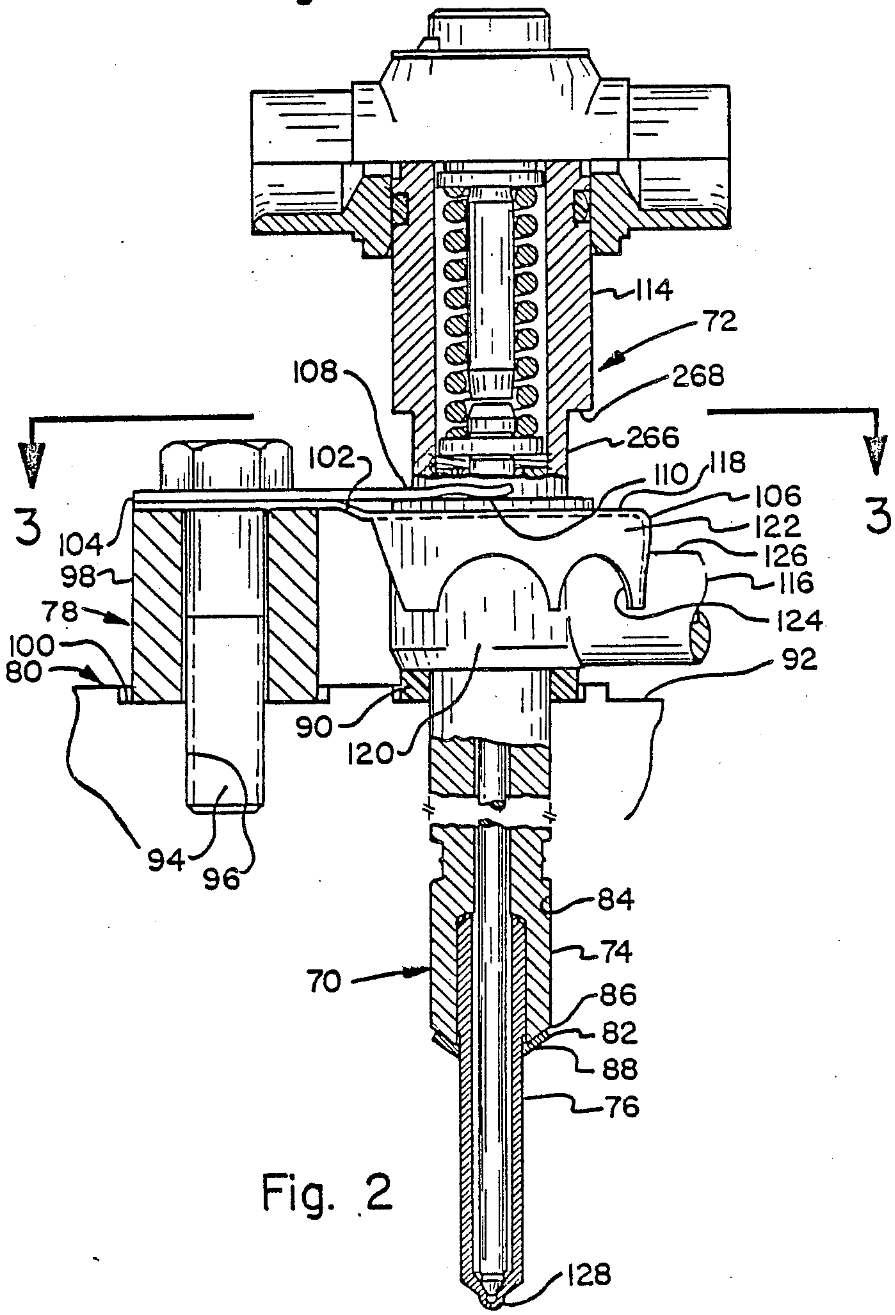
FIG. 2 is an elevation view of a fuel injection nozzle having a slim tip profile, in accordance with a second embodiment of the invention in the form of a fuel injection nozzle assembly for mounting in an engine cylinder head.

The nozzle 70 of the nozzle assembly embodiment 72 illustrated in FIG. 2 is substantially similar to that illustrated in FIG. 1 except that the nozzle body 74 is adapted to incorporate the so-called "slim tip" insert 76. The nozzle assembly 72 illustrated in FIG. 2 includes the associated clamping subassembly 78 for securing the nozzle 70 to the cylinder head 80. In this embodiment, also shown in FIG. 6, the primary seal 82 between the nozzle 70 and the cylinder head 80 is effected in the mounting socket 84, at the transition shoulder 86 of nozzle body 74 to the nozzle tip insert 76. The inwardly tapered shoulder 86 on the nozzle body mates with an opposing tapered shoulder 88 on the cylinder head mounting socket 84, with a relatively thin, frustoconical seal member 82 interposed therebetween. The clamp subassembly 78 urges the nozzle 70 downward into the cylinder mounting socket 84 such that the major component of the vertical sealing pressure is applied against the combustion seal 82. The head seal 90 at the upper surface 92 of the cylinder head is secondary in nature, and is intended primarily to prevent dust/water ingress into annular passageway between the nozzle body and the cylinder head jacket to reduce vibrations and stabilize the nozzle. Seal 82 and shoulder 88 also establish the nozzle axial location relative to the cylinder head.

The details of the preferred embodiment of the clamp subassembly 78 will now be described with reference to FIGS. 2 and 3. A threaded bolt 94 is sized for engagement with a correspondingly threaded bore 96 in the upper surface of the cylinder head. A spacer 98 rests on the upper surface 100 of the cylinder head 80 around the bore 96 and provides a support surface for mounting arms 102, 104 of the locator plate 106 and the leaf spring 108. The leaf spring 108 has a stiffening kink 110 in the portion cantilevered to the nozzle 70, so that when the bolt 94 is torqued downwardly, the leaf spring 108 transmits a centrally located downward force onto a land structure or flange 112 on the nozzle cap 114, which in turn is transmitted to the fuel inlet stud 116 at its connection with the nozzle body 74. Preferably, the spring 108 is forked such that two prongs 117 rest on radially opposite portions of the flange 112 on the nozzle cap (e.g. flange 172 in FIG. 1). The downward force supplied by the leaf spring 108 also assures the maintenance of a tight connection between the nozzle cap 114 and the fuel inlet stud 116, thereby helping to stabilize the connection between the stud 116 and the nozzle body 74.

The locating plate 106 includes a flat, substantially annular portion 118 having an inner diameter larger than the outer diameter of the cap flange 112 so that the plate rests transveresly on the ring portion 120 of the inlet stud. A generally semi-circular skirt portion 122 extends downwardly from the flat portion 118 and includes one or more, preferably semi-circular recesses or scallops 124. If a plurality of recesses are provided, they are preferably spaced at 45 degree intervals on the skirt 122, about the nozzle centerline. Each recess 124 is sized to fit around the upper half of the tubular portion 126 of the inlet stud, immediately adjacent the juncture of the ring 120 and tubular 126 portion of the stud 116.

The clamp subassembly 78 in accordance with the invention can be manufactured as a universal part for use with a variety of nozzle sizes. Since in most instances the discharge apertures 128 at the nozzle tip 76 are not symmetric about the axial centerline, the nozzle must be installed in the mounting socket 84 in a particular radial orientation. The locating plate 106 in accordance with the invention assures that if a particular recess 124 is specified for cradling the tubular portion 126 of the inlet stud, the discharge apertures will be uniquely oriented relative to the cylinder.

Figure 4:
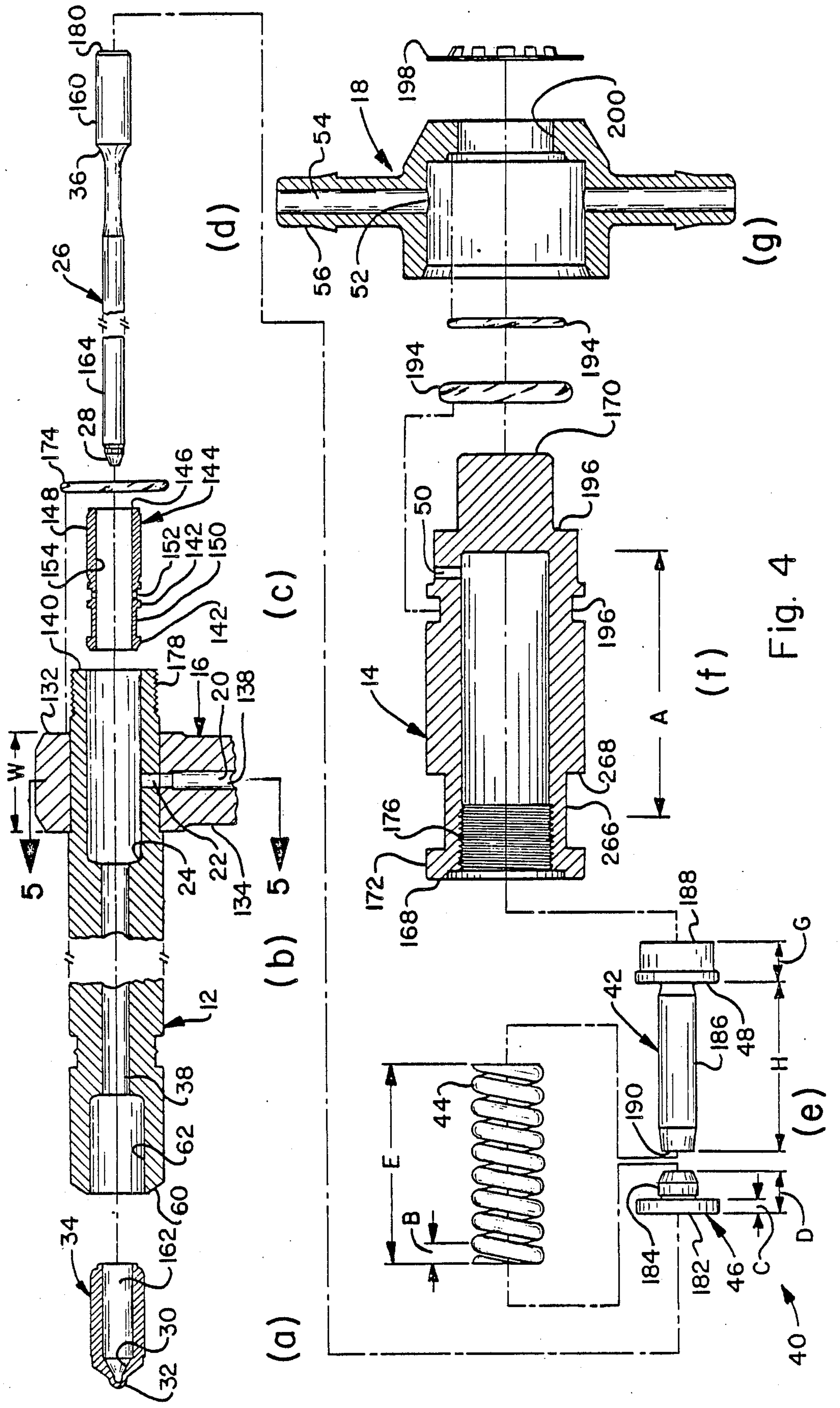
FIGS. 4 (*a*) through (*g*) constitute a composite exploded view of the nozzle of FIG. 1, more clearly illustrating the individual components and the manner in which the components are assembled.

The description will proceed further in accordance with the order in which the various components of the nozzle 10 are connected together during fabrication. This description will best be understood with reference to FIGS. 1, 4, 5 and 6. In FIG. 4, the component parts of the nozzle 10 are shown in an exploded view, with each of subfigures 4(*a*)-(*g*) illustrating a particular component.

The fabrication of the nozzle 10 begins with the transverse attachment of the inlet stud 16 to the nozzle body 12. This is preferably accomplished by heat shrinking the substantially annular ring portion 132 of a banjo stud onto the substantially cylindrical nozzle body 12 at a position lateral to the valve chamber 24. The ring portion of the stud preferably encompasses a full 360 degrees and is integral with the radially extending tubular portion 134. The ring portion 132 has an inner diameter at ambient temperature that is smaller than the outer diameter of the nozzle body portion to which it will be connected. The tubular portion has a longitudinal blind passage 20 of a first diameter extending inwarding from the inlet stud outer end 136 to a terminal position substantially Within the ring portion 132, but short of the inner diameter wall in the ring.

The width w of the ring portion 132 and the axis 138 of the blind passage 20 of every stud 16 have a predetermined geometric relationship, so that the upper end 140 of the nozzle body can be utilized as a reference point for accurately positioning the passage 20 with respect to the valve chamber 24. The ring portion is first heated to expand the inner diameter thereof to a dimension greater than the outer diameter of the body portion. The ring 132 is then slipped over the body portion without interference contact, a predetermined distance relative to the upper end 140 of the nozzle body 12. The ring 132 is cooled to form a rigid, shrink-fit, annular connection with the body portion, in such a manner to prevent leakage path formation.

In the preferred embodiment, the nozzle body 12 is made from non-heat treated type 11L41 steel with a major ground diameter of 0.3740-0.3745 inch, and the stud 16 is made from non-heat treated type 12L15 steel with a 0.0675 inch blind ID passage 20.

A drilling tool is then inserted through the blind passage and is advanced to penetrate the remaining material in the ring portion 132 and the adjacent wall of the nozzle body 12. The location of this second passage 22 is chosen for establishing fluid communication with the edge filter portions 142 of the integral guide edge filter member 144 when it is inserted into the nozzle body as described below. The passage 22 through the ring portion into the chamber is reamed, deburred and then burnished. The second passage 22 is preferably of a slightly smaller diameter than the initial blind passage 20, e.g., 0.0625 inch ID. The step of burnishing provides a surprisingly advantageous result, in that a fluid seal is achieved at the juncture of the second passage 22 with the interface between the nozzle body exterior and the ring interior. This avoids the need to provide separate seal structure between the ring 132 and the body portion 12.

The next step is to insert and preferably stake the integral guide/edge filter member 144 into the valve chamber 24 of the nozzle body 12, such that the upper end 146 of the guide is flush with the upper end 140 of the nozzle body. This can best be understood with reference to FIGS. 4 (*b*) and (*c*) and FIG. 1. The outer, cylindrical mounting portion 148 of the guide member has been carefully machined to provide an appropriate interference fit against the wall of the valve chamber 24. The forward, or downward portion of the guide filter member 144 preferably includes a recessed, annular space 150 which, after insertion of the guide member into the valve chamber, is in fluid communication with the passage 22 from the inlet stud 16. The two annular edges 142 defining the recess 150 provide the "edge filter" effect such that fuel entering the recess 150 must pass over the edges 142 in order to reach the valve chamber. Half of the fuel being filtered by the upper edge 142 is channeled to the apertures 152 through which the fuel enters the guide member hollow interior 154 on its way to the valve chamber 24.

It should be appreciated that the guide member 144 could be secured to the chamber 24 other than by staking. Although staking is preferred, epoxy or other adhesive or the like, compatible with press-fit insertion, could also be used. Also, the guide member 144 need not have the integral edge filter portion. A separate, annular filter ring could be inserted below the guide member, or for some types of service use, the filter could be omitted from the nozzle body.

The next step is to orient and assemble the nozzle tip 34 into a press-fit and preferably staked relation with the tip cavity 62 (see FIGS. 4(*a*) and (*b*)). The discharge apertures 32 in the tip are normally not symmetric and thus require a tactile or other test for proper orientation relative to the orientation of the inlet stud 16 on the nozzle body 12. The tip bore 162 and the nozzle body axial channel or bore 38 are thus coaxially aligned for receiving the nose 28 and stem 164 portions of the valve. The portion of the body 12 around the tapered shoulder 60 may advantageously be plastically crimped against tip 34 to form a pinching lip or the like as appears at 166 in FIG. 6. The nozzle tip 34 as installed is demagnetized and ultrasonically cleaned. This demagnetizing and cleaning is performed subsequent to the remaining assembly operations, and will not be again mentioned.

The next step is to accurately measure the dimensions of the interior 154 of the guide filter member 144 and to select a valve 26 having a bearing surface 160 of appropriate dimensions for proper diametrical clearance. The valve 26 is then inserted through the top end of the nozzle body 140, through the nozzle bore 38, until the nose 28 contacts the valve seat 30 in the tip insert 34.

In a manner easily accomplished by those skilled in this art, the valve is then pressure tested and inspected to ensure that there is no fluid leakage when the valve nose 28 is properly seated in the tip seat 30, and that the bypass leakage between the guide filter member 144 and the bearing surface 160 of the valve 26 is within specification. This assures that the fuel quantity and rate generates sufficient pressure against the generally conical actuating surface 36 of the valve 26 to lift the valve against the spring force to be described more fully below.

In parallel with the assembly of the components mentioned above, the nozzle spring subassembly as shown in FIGS. 4(*e*) and (*f*) can be assembled. The cap 14 is a generally cylindrical member open at its lower end 168 and closed with a projecting boss at its upper end 170. The lower end includes a flange portion 172 for abutting the ring portion 132 of the inlet stud. A suitable O-ring 174 is provided for preventing low pressure fluid from leaking out of the lower end of the right cap. Above the flange 172 are provided internal threads 176 for engaging the external threads 178 at the upper end of the nozzle body 12.

The primary function of the spring chamber, or nozzle cap subassembly is to properly position the spring and lift stop components shown in FIG. 4(*e*). A critical dimension is the "as assembled" distance A between the upper end 180 of the valve, and the dome at the upper end of the cap 14. This distance can be determined from automated measurement of the nozzle body with valve inserted at one station, and measurement of the cap and internal components thereof at one or more other stations.

The spring seat 46 includes a generally disk-shaped base portion 182 for contacting the upper end 180 of the valve, and a pedestal portion 184 projecting upwardly therefrom. The lift stop 42 includes a stem portion 186 axially aligned with another spring seat 48 and a head portion 188 which is received in abutting relation with the dome of the cap. The radially outer portions of the spring seats 182, 48 are adapted to engage the ends of the coil spring 44 and to hold it compressively in place. Stem portion 186 and head portion 188 pilot the spring 44.

Before the spring seat 46, lift stop 42 and spring 44 are assembled and inserted into the cap, the dimensions C, D, E-B, and H are measured. For a given nozzle type, the desired compression distance B from the neutral length E of the spring is a constant. Similarly, the desired lift stop limit gap distance F is constant (see FIG. 1). The ideal relationship for the dimensions relating to spring controlled opening pressure, is:

$$A=E-B+C+G$$

The ideal relationship for the dimensions relating to the stop limit is:

$$A=D+F+G+H$$

In order to satisfy both relationships, the head 188 on the lift stop 42 is ground as necessary for adjusting dimension G, which effects the degree of compression of the spring and therefore the valve lift off or opening pressure. The length H of the stem portion 186 is adjusted by grinding nose 190 to affect the size of the gap F between the pedestal 184 and the lift stop 42. Thus, preferably two ends of a single part are ground, although it should be evident that, for example, the upper surface of pedestal 184 could be ground instead of nose 190.

After grinding, the spring subassembly 40 is inserted into the nozzle cap 14, which is then torqued onto the upper end 140 of the nozzle body 12. This particular step is the only step involved in the preferred fabrication of the nozzle 10 which requires rotation. It should be clear, however, that this rotation is relatively simple to accomplish in that the torque is applied to the exterior surface of the nozzle cap and it is a very simple operation as compared with the rotation or radial expansion of internal ferrules, nuts, keys and the like, which characterize the prior art.

After assembly of the nozzle 10, a variety of functional tests are performed such as testing for "chatter", the desired spray pattern, the opening pressure, and leakage at the seat and the guide member, etc.

The nozzle 10 so assembled may be intended for use in a variety of engine types and environments. The fuel inlet stud 16 occupies considerable space transversely to the axis of the nozzle body and, thus, the need often arises to orient the inlet stud obliquely or even somewhat parallel to the nozzle body axis. In situations where this is desirable, the tubular portion 134 of the inlet stud 16 may be bent at substantially any angle in the range of 0 to 360 degrees horizontally, or 0 to 90 degrees vertically or any combination thereof. After bending of the inlet stud, the nozzle assembly can be painted or otherwise coated.

After coating, a plastic or metal leak-off cap 18 can be snapped on over the upper end 170 of the nozzle cap. The leak-off cap forms one or more annular recesses 52 with the nozzle cap, leading to radial flow channels 54 in fluid communication with the leak-off channel 50 in the nozzle cap, whereby fluid at low pressure within the nozzle cap 14 can be diverted away and recycled if desirable. Seal means such as O-rings 194 are provided in seating recesses 196 on the exterior of the nozzle cap for actuation against opposed surfaces on the interior portion of the leak-off cap. A fastener 198 is positioned on the projection 170 of the nozzle cap through a central opening 200 in the leak-off cap 18 to permit relative rotation thereof.

Referring now to FIGS. 1 and 2, the final components are mounted on the nozzle 10, 72. For the standard tip design shown in FIG. 1, an aluminum seal washer 66 is positioned immediately below the connector ring 132 on the inlet stud 16, and a compression seal 64 is positioned on the recesses on the exterior of the nozzle body immediately above the tip insert 34. For the slim tip nozzle illustrated in FIG. 2, a rubber dust seal 90 is positioned over the nozzle body 12 immediately below the ring portion I20 of the inlet stud, and a frustoconical copper combustion seal 82, is installed on the nozzle body shoulder 86.

The seal 82 for the slim tip nozzle is initially in the form of a flat, preferably copper washer, having an inner diameter only slightly less than the maximum outer diameter of the tip insert 76. The tip insert is tapered slightly inward toward the lower end. The seal is positioned adjacent the nozzle body shoulder 86 and a uniform pressure is applied on the underside thereof to plasticly deform the washer into a substantially frustoconical shape. The resulting seal member 82 has an interference fit with the tip insert at its juncture with the nozzle body shoulder, whereby it is self-retained. Although copper is preferred, other metals such as aluminum can also be utilized for the seal member 82.

Figure 6:
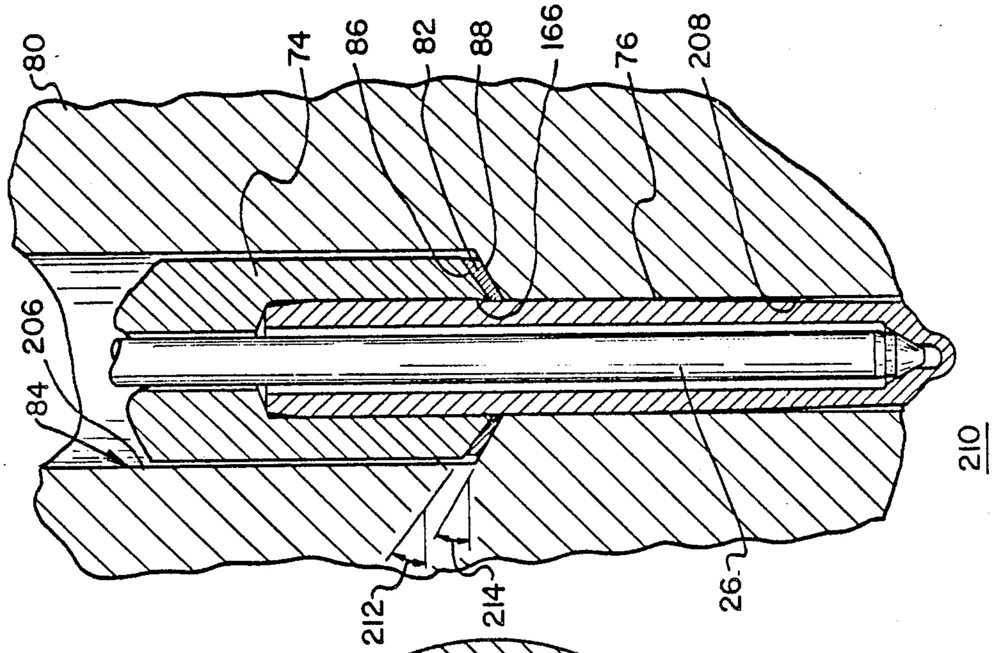
FIG. 6 is an enlarged detailed view of the tip portion of the slim tip nozzle illustrated in FIG. 2, after the nozzle has been inserted into the mounting socket of the cylinder head.
Figure 5:
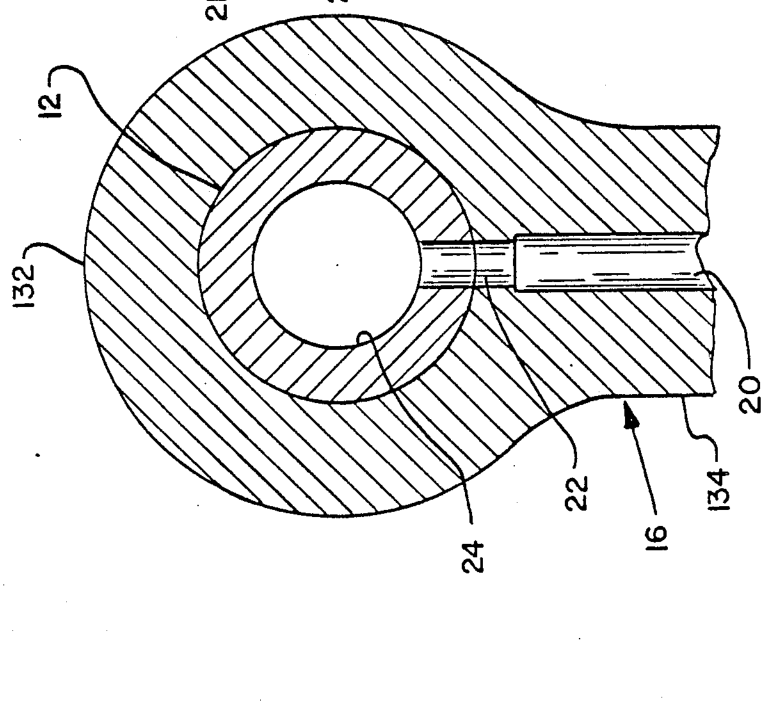
FIG. 5 is a section view, taken along line 5—5 of FIG. 4, showing the connection of the inlet stud to the nozzle body.

As shown in FIG. 6, the nozzle mounting socket 84 in the engine cylinder head 80 has a large diameter bore 206 open at its top to the upper surface of the cylinder head and a small diameter bore 208 open at its lower end to an engine cylinder 210. An annular, socket shoulder 88 extends therebetween and has a taper angled upwardly from the small bore to the large bore. The nozzle body shoulder 86 has a taper angle 212 slightly greater than the angle 214 of the socket shoulder 88, with respect to horizontal. In a preferred embodiment, the socket shoulder taper angle 214 is about 31 degrees, whereas the nozzle body shoulder angle 212 is about 35 degrees.

Figure 3:
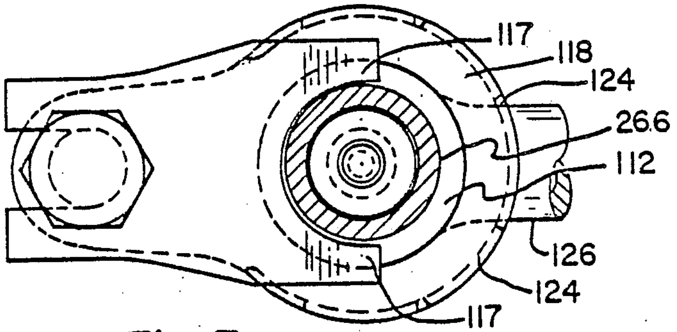
FIG. 3 is a top view of the nozzle assembly shown in FIG. 2.

When the nozzle body 74 is fully installed in the cylinder head, as by the clamp arrangement shown in FIG. 2 and 3, the downward force on the nozzle body is applied preferentially on the annular seal member 82, towards the inner portion thereof nearest the tip insert 76. Thus, the differential taper angles of the nozzle body and socket shoulders 212, 214 tend to concentrate the downward pressure of the nozzle body toward the juncture of the seal member 82 with the nozzle tip 76, where optimum sealing occurs against the pressure from the engine cylinder during firing. Generally, the difference in taper angle should be approximately four degrees; an angle difference that is too small will not properly concentrate the downward force and an angle difference that is too great will result in circular line-type seal which is subject to leakage resulting from slight imperfections in the socket wall.

Figure 7:
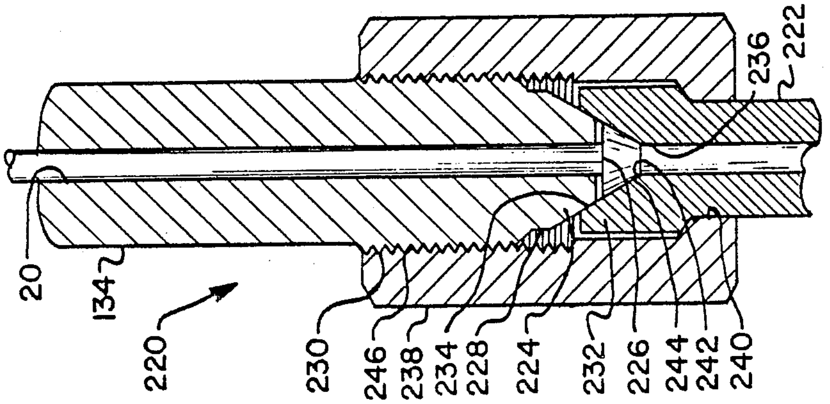
FIG. 7 is a side view in section of the connection between the fuel inlet stud and fuel supply line in accordance with another feature of the invention.

FIG. 7 shows the details of the preferred fuel line connection 220 between the exposed, outer end of the tubular portion 134 of the inlet stud 16 and the mating end of a fuel supply line 222. The stud has a conical nose portion 224 with a central aperture 226 defining the entrance to the axial passageway 20. The base portion 228 of the nose preferably has a smaller diameter than the outer diameter of the tubular portion 134 of the stud. A raised, threaded portion 230 extends axially along the exterior, between the base 228 of the nose and the tube proper 134.

The nozzle supply line 222 terminates in an enlarged head portion 232 having an outer diameter substantially equal to the outer diameter of the nose base portion 228 and having an inwardly tapered flared wall 234 that matches the taper angle on the nose 224. The head 232 includes a central opening 236 aligned with the opening 226 in the nose when the nose and the head are intimately engaged.

In the illustrated embodiment, the supply line 222 carries an elongated, hexagonal nut 238 having a smaller diameter opening 240 for sliding engagement with the outer surface of the supply line proper, and a tapered shoulder portion 242 for engaging a shoulder 244 on the portion of the head 232 away from the nose 224. The large diameter bore 246 in the nut is sized to slide over the head, and is internally threaded over a portion thereof to engage the threads on the raised portion 230 of the tube 134. Torquing the nut draws the nose 224 into a sealing relation with the head 232 and provides a high pressure, leak-tight fuel supply path at lower torque levels than commonly used.

It should be appreciated by those skilled in this art that the nose and head portions, and the orientation of the hexagonal nut could be reversed.

The fuel line connection as described above is easily connected in the field and quite reliable. The simplicity is made possible in part by the relocation of the fuel filter from its conventional location in the inlet stud near the fuel line connection 220, to a location within the nozzle body.

Figure 9:
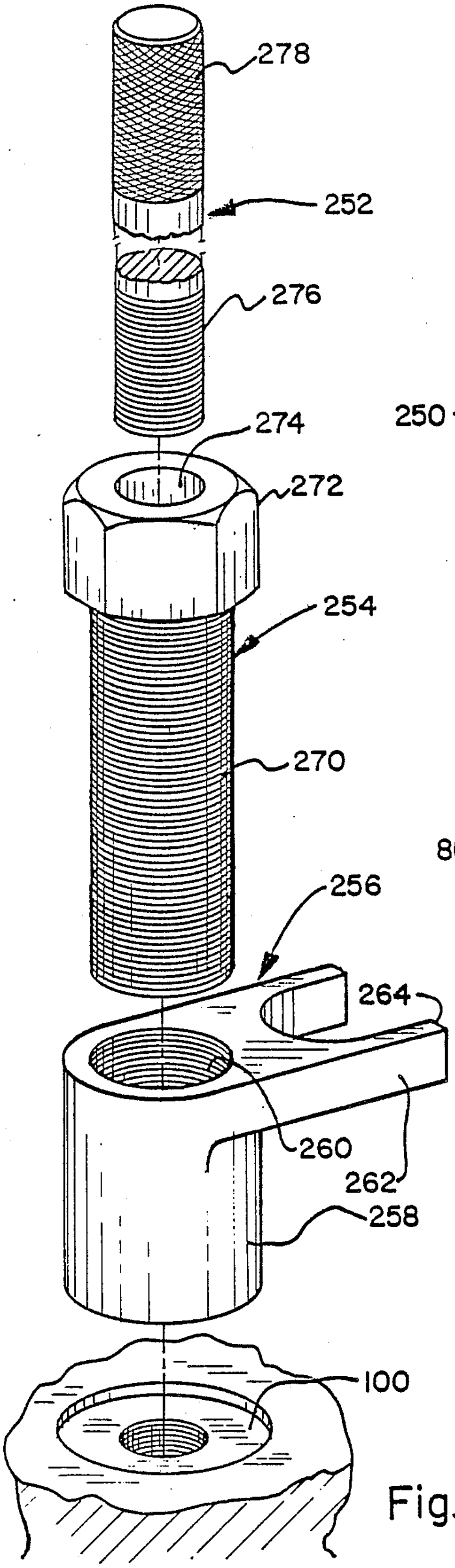
FIG. 9 is an exploded view of the component parts of the nozzle removal tool shown in FIG. 8.
Figure 8:
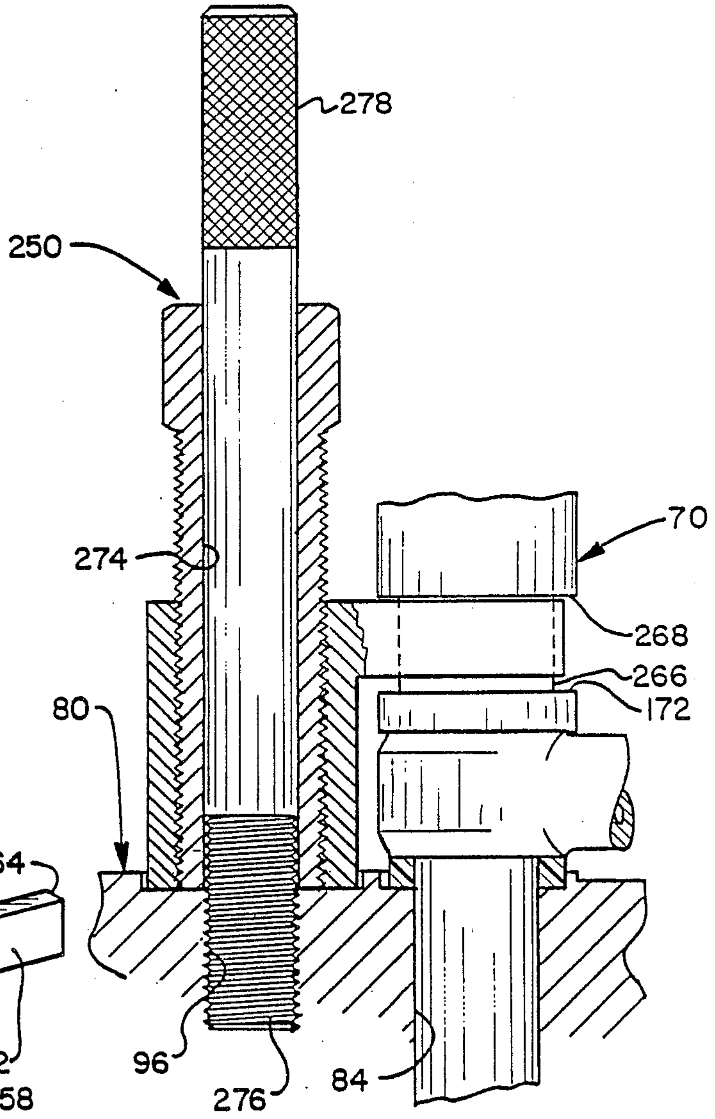
FIG. 8 is an elevation view similar to FIG. 2, showing the nozzle removal tool engaged with the nozzle for removing the nozzle from the cylinder head.

FIGS. 8 and 9 show another feature of the invention, for use in removing the nozzle from the cylinder head. Frequently, after a period of long continuous service, the nozzle mounting arrangement shown in FIG. 2, or similar assemblies, may have a tendency to stick in the cylinder head. In particular, after the clamping subassembly 78 has been disengaged from the cylinder head 80 and removed, the nozzle 10 i.e., the structure shown in FIG. 1, is not easily manually lifted out of the nozzle socket 84. If a screwdriver or similar common tool is used to pry the nozzle loose, an unbalanced torque or bending load can easily damage the tip, particularly the slim tip shown in FIG. 2.

In accordance with the present invention, after the clamping subassembly has been removed to expose the threaded bore 96 and the surface 100 of the cylinder head 80 immediately adjacent the bore 96, a nozzle removal tool 250 is installed and manually operated. As shown particularly in FIG. 9, the nozzle tool has three main parts, a central jacking bolt 252, a jack screw 254, and a yoke member 256.

Preferably, the yoke member 256 is placed on the cylinder head 80. The spacer body portion 258 of the yoke member 256 includes a vertically extending threaded bore 260 which is positioned coaxially with the threaded bore 96. A yoke portion 262 extends laterally from the spacer body 258 and includes a pair of yoke arms 264 which are positioned on either side of neck portion 266 of nozzle 70. In the illustrated embodiment, the neck portion 266 is located between lower flange 172 and upper shoulder 268 of the nozzle cap.

The screw portion 270 of jack screw 254 is then substantially fully threaded into bore 260 of yoke member 256. The jack screw 254 has, typically, a hexagonal head portion 272 and a smooth bore 274 extending through the head 272 and screw portion 270. It can be appreciated that, optionally, the jack screw 254 can be at least partially threaded into the bore 260 of the yoke member 256, before the yoke member is positioned, as illustrated in FIG. 8. In any case, the jack screw 254 and yoke member 256 thus form a subassembly in which the yoke arms 264 are positioned immediately below the shoulder 268 on the nozzle, and the smooth bore 274 is coaxially aligned with bore 96. The jacking bolt 252 is then passed through the bore 274 and the threaded lower end thereof 276 is threaded to the cylinder head 80. The advancement of the bolt 252 can be facilitated by knurling of the upper end 278 of the bolt so that it may be turned by any one of a variety of simple hand tools.

Once the bolt 252 has been secured to the cylinder head 80, a simple wrench or similar hand tool (not shown) is engaged with the jack screw head 272 and the jack screw is rotated such that the yoke member 258 is drawn relatively upward into contact with the shoulder 268. Continued rotation of the jackscrew 254 transfers the lifting force from the threaded connection between the jackscrew and the yoke member to the yoke arms 264, whereby the nozzle 70 is lifted out of the nozzle socket 84. The opposed yoke arms provide a balanced force on the shoulder 268 and prevent unwanted bending loads on the nozzle that could damage the nozzle tip.

We claim:

1. A tool for removing a fuel injection nozzle from a socket in the cylinder head of an engine, comprising:

a yoke member having a threaded bore and a laterally extending yoke portion for engaging the nozzle;

a jackscrew having a screw portion engaging the bore of the yoke member, means for rotating the jackscrew relative to the yoke member and a smooth bore traversing the jackscrew coaxial with the bore of the yoke member; and a jacking bolt traversing the jack screw bore and including a threaded lead end for engaging the cylinder head and a trailing end projecting upwardly from the jack screw for rotating the bolt to engage the cylinder head.

2. The tool of claim 1, wherein the yoke member includes a generally cylindrically body portion containing the threaded bore, and a laterally projecting yoke portion at the upper end of the body portion, the yoke portion including two spaced apart arms adapted to cradle a portion of the nozzle.

3. The tool of claim 1 wherein the means for rotating the jack screw comprises an enlarged head portion at the upper end of the jackscrew.

4. The tool of claim 1 wherein the trailing end of the jacking bolt has a knurled surface.

* * * * *